(12) United States Patent
Hong

(10) Patent No.: US 11,197,147 B2
(45) Date of Patent: Dec. 7, 2021

(54) UNMANNED AERIAL VEHICLE ACCESS METHOD AND DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/633,848

(22) PCT Filed: Aug. 10, 2017

(86) PCT No.: PCT/CN2017/096854
§ 371 (c)(1),
(2) Date: Jan. 24, 2020

(87) PCT Pub. No.: WO2019/028746
PCT Pub. Date: Feb. 14, 2019

(65) Prior Publication Data
US 2020/0221280 A1     Jul. 9, 2020

(51) Int. Cl.
*H04W 4/00* (2018.01)
*H04W 8/04* (2009.01)
(Continued)

(52) U.S. Cl.
CPC .......... *H04W 8/04* (2013.01); *H04B 7/18506* (2013.01); *H04W 12/06* (2013.01);
(Continued)

(58) Field of Classification Search
CPC ..... H04W 48/02; H04W 48/04; H04W 48/17; H04W 4/08; H04W 60/00; H04W 76/10;
(Continued)

(56) References Cited

U.S. PATENT DOCUMENTS 9,019,887 B2 * 4/2015 Lim ................. H04W 8/04
                                                          370/313
9,826,415 B1 * 11/2017 Byrne ................. H04W 8/005
(Continued)

FOREIGN PATENT DOCUMENTS

CN          1913679 A     2/2007
CN        102905266 A     1/2013
(Continued)

OTHER PUBLICATIONS

Extended European Search Report in Application No. 17920914.3, dated Dec. 21, 2020.
(Continued)

*Primary Examiner* — Joseph Arevalo
(74) *Attorney, Agent, or Firm* — Syncoda LLC; Feng Ma

(57) ABSTRACT

An unmanned aerial vehicle access method includes: when an access request message sent by an unmanned aerial vehicle is received, acquiring an international mobile equipment identity (IMEI) of the unmanned aerial vehicle; performing identity authentication on the unmanned aerial vehicle according to the IMEI of the unmanned aerial vehicle so as to obtain an identity authentication result; if the identity authentication result is authentication success, determining to accept the access of the unmanned aerial vehicle; and sending, to the unmanned aerial vehicle, a first access response message for indicating that the access is accepted. Therefore, an unmanned aerial vehicle without passing the identity authentication can be prevented from accessing a cellular network, thereby reducing interference to the cellular network, improving the reliability of the access of the unmanned aerial vehicle.

11 Claims, 10 Drawing Sheets

(51) Int. Cl.
    *H04B 7/185*     (2006.01)
    *H04W 12/06*     (2021.01)
    *H04W 12/08*     (2021.01)
    *H04W 48/02*     (2009.01)
    *H04W 12/71*     (2021.01)

(52) U.S. Cl.
    CPC ........... *H04W 12/08* (2013.01); *H04W 12/71* (2021.01); *H04W 48/02* (2013.01)

(58) Field of Classification Search
    CPC ..... H04W 76/11; H04W 76/12; H04W 80/04; H04W 84/045; H04W 88/005; H04W 88/08; H04W 88/16; H04W 8/04; H04W 24/02; H04W 24/10; H04W 28/0247; H04W 28/0252; H04W 28/08; H04W 52/243; H04W 52/244; H04W 52/283; H04W 72/0413; H04W 72/042; H04W 72/0446
    USPC ......... 455/343.1, 411, 41.2, 435.2, 464, 445, 455/509, 435.1; 370/338
    See application file for complete search history.

(56) References Cited

U.S. PATENT DOCUMENTS

| | | | | |
|---|---|---|---|---|
| 9,948,380 | B1* | 4/2018 | Vos | H04W 24/02 |
| 10,446,043 | B2* | 10/2019 | Lau | G08G 5/0021 |
| 2016/0103579 | A1 | 4/2016 | Coulmeau et al. | |
| 2017/0124884 | A1* | 5/2017 | Shaw | G08G 5/0034 |
| 2018/0253092 | A1* | 9/2018 | Trapero Esteban | H04W 12/06 |
| 2018/0295659 | A1* | 10/2018 | Shan | H04L 12/1407 |
| 2018/0375568 | A1* | 12/2018 | De Rosa | H04W 72/04 |
| 2019/0019420 | A1* | 1/2019 | X | G08G 5/0008 |
| 2019/0045580 | A1* | 2/2019 | Chai | H04W 92/02 |
| 2019/0182873 | A1* | 6/2019 | Wass | H04W 76/10 |
| 2020/0162149 | A1* | 5/2020 | Poscher | G06Q 10/0631 |

FOREIGN PATENT DOCUMENTS

| | | |
|---|---|---|
| CN | 104950907 A | 9/2015 |
| CN | 104980210 A | 10/2015 |
| CN | 105225540 A | 1/2016 |
| CN | 105554687 A | 5/2016 |
| CN | 106296871 A | 1/2017 |
| CN | 106507276 A | 3/2017 |
| CN | 108616861 A | 10/2018 |
| EP | 3349085 A1 | 7/2018 |
| WO | 2017013417 A1 | 1/2017 |
| WO | 2017042403 A1 | 3/2017 |

OTHER PUBLICATIONS

NTT Docomo, Inc: "Aerial Vehicle UE identification", 3GPP TSG-RAN2#98, Apr. 15-19, 2017, Hangzhou, P.R. China, R2-1704335.
Chen Xin, "Function of EIR", Release date Jan. 31, 1995, Publisher: GSM Digital Cellular Mobile Telecommunications.
Technical Specification Group Services and System Aspects; General Packet Radio Service(GPRS) Enhancements for Evolved Universal Terrestrial Radio Access Network (E-UTRAN) access (Release 15), 3GPP TS23.401, V15.0.0 (Jun. 2017).

* cited by examiner

_(1)_

UNMANNED AERIAL VEHICLE ACCESS METHOD AND DEVICE

CROSS-REFERENCE TO RELATED APPLICATION

This application is a national stage of International Application No. PCT/CN2017/096854 filed on Aug. 10, 2017, the disclosure of which is hereby incorporated by reference in its entirety.

TECHNICAL FIELD

The present disclosure generally relates to the field of communications, and in particular, to an access method and an access device of an Unmanned Aerial Vehicle.

BACKGROUND

An Unmanned Aerial Vehicle is referred to as UAV, which is a non-manned aerial vehicle operated by a radio remote control equipment and its own program control device.

With the continuous development of UAV technologies, UAVs have also been widely used. In the related art, in order to further expand the application range of UAVs, a cellular network needs to provide service for UAVs that satisfy the demand. However, there is no technical solution for controlling UAVs in the existing cellular network. If any type of UAV is allowed to access the cellular network, it will cause great interference to the cellular network.

SUMMARY

In order to overcome the problems in the related art, embodiments of the present disclosure provide an access method and an access device of a UAV.

According to a first aspect of embodiments of the present disclosure, there is provided an access method of an Unmanned Aerial Vehicle (UAV), applied to a Mobility Management Entity (MME), the method including:

obtaining an International Mobile Equipment Identity (IMEI) of the UAV upon receiving an attach request sent by the UAV;

performing identity authentication on the UAV according to the IMEI of the UAV so as to obtain an identity authentication result;

determining to accept an access of the UAV if the identity authentication result is authentication success; and sending to the UAV a first attach response indicating acceptance of the access.

Optionally, the obtaining the IMEI of the UAV includes:

sending an identity request to the UAV, the identity request being used to instruct the UAV to provide its own IMEI; and receiving an identity response sent by the UAV, the identity response carrying the IMEI of the UAV.

Optionally, the attach request carries the IMEI of the UAV, and the obtaining the IMEI of the UAV includes:

reading the IMEI of the UAV from the attach request.

Optionally, the performing identity authentication on the UAV according to the IMEI of the UAV so as to obtain an identity authentication result includes:

sending an identity check request to an Equipment Identity Register (EIR), the identity check request carrying the IMEI of the UAV;

determining that the identity authentication result is authentication success if a first identity check response sent by the EIR indicating that the IMEI of the UAV has been registered is received;

determining that the identity authentication result is authentication failure if a second identity check response sent by the EIR indicating that the IMEI of the UAV has not been registered is received.

Optionally, the method further includes:

determining to reject the access of the UAV if the identity authentication result is authentication failure;

sending to the UAV a second attach response indicating rejection of the access.

According to a second aspect of embodiments of the present disclosure, there is provided an access method of a UAV, applied to the UAV the device type of which is defined as UAV and which has an International Mobile Equipment Identity (IMEI), and the method includes:

sending an attach request to a Mobility Management Entity (MME);

determining that the MME accepts access of the UAV if a first attach response sent by the MME indicating acceptance of the access is received.

Optionally, the method further includes:

receiving an identity request sent by the MME, the identity request being used to instruct the UAV to provide its own IMEI;

sending an identity response to the MME, the identity response carrying the IMEI of the UAV.

Optionally, the attach request carries the IMEI of the UAV.

Optionally, the method further includes:

determining that the MME rejects the access of the UAV if a second attach response sent by the MME indicating rejection of the access is received.

According to a third aspect of embodiments of the present disclosure, there is provided an access method of a UAV, applied to an Equipment Identity Register (ERI), the method including:

receiving an identity check request sent by a Mobility Management Entity (MME), the identity check request carrying an International Mobile Equipment Identity (IMEI) of the UAV that requests access;

determining whether the IMEI of the UAV has been registered;

sending to the MME a first identity check response indicating that the IMEI of the UAV has been registered if it is determined that the IMEI of the UAV has been registered; and sending to the MME a second identity check response indicating that the IMEI of the UAV has not been registered if it is determined that the IMEI of the UAV has not been registered.

According to a fourth aspect of embodiments of the present disclosure, there is provided an access device of a UAV, applied to a Mobility Management Entity (MME), the device including:

an obtaining module configured to obtain an International Mobile Equipment Identity (IMEI) of the UAV upon receiving an attach request sent by the UAV;

an identity authentication module configured to perform identity authentication on the UAV according to the IMEI of the UAV so as to obtain an identity authentication result;

a first determining module configured to determine to accept an access of the UAV if the identity authentication result is authentication success; and a first sending module configured to send to the UAV a first attach response indicating acceptance of the access.

Optionally, the obtaining module includes:

a first sending sub-module configured to send an identity request to the UAV, the identity request being used to instruct the UAV to provide its own IMEI;

a receiving sub-module configured to receive an identity response sent by the UAV, the identity response carrying the IMEI of the UAV.

Optionally, the attach request carries the IMEI of the UAV, and the obtaining module includes:

a reading sub-module configured to read the IMEI of the UAV from the attach request.

Optionally, the identity authentication module includes:

a second sending sub-module configured to send an identity check request to an Equipment Identity Register (EIR), the identity check request carrying the IMEI of the UAV;

a first authentication sub-module configured to determine that the identity authentication result is authentication success if a first identity check response sent by the EIR indicating that the IMEI of the UAV has been registered is received;

a second authentication sub-module configured to determine that the identity authentication result is authentication failure if a second identity check response sent by the EIR indicating that the IMEI of the UAV has not been registered is received;

Optionally, the device further includes:

a second determining module configured to determine to reject the access of the UAV if the identity authentication result is authentication failure;

a second sending module configured to send to the UAV a second attach response indicating rejection of the access.

According to a fifth aspect of embodiments of the present disclosure, there is provided an access device of a UAV, applied to the UAV the device type of which is defined as UAV and which has an International Mobile Equipment Identity (IMEI), the device including:

a first sending module configured to send an attach request to a Mobility Management Entity (MME);

a first determining module configured to determine that the MME accepts an access of the UAV if a first attach response sent by the MME indicating acceptance of the access is received.

Optionally, the device further includes:

a receiving module configured to receive an identity request sent by the MME, the identity request being used to instruct the UAV to provide its own IMEI; and a second sending module configured to send an identity response to the MME, the identity response carrying the IMEI of the UAV.

Optionally, the attach request carries the IMEI of the UAV.

Optionally, the device further includes:

a second determining module configured to determine that the MME rejects the access of the UAV if a second attach response sent by the MME indicating rejection of the access is received.

According to a sixth aspect of embodiments of the present disclosure, there is provided an access device of a UAV, applied to an Equipment Identity Register (ERI), the device including:

a receiving module configured to receive an identity check request sent by a Mobility Management Entity (MME), the identity check request carrying an International Mobile Equipment Identity (IMEI) of the UAV that requests access;

a determining module configured to determine whether the IMEI of the UAV has been registered;

a first sending module configured to send to the MME a first identity check response indicating that the IMEI of the UAV has been registered if it is determined that the IMEI of the UAV has been registered; and a second sending module configured to send to the MME a second identity check response indicating that the IMEI of the UAV has not been registered if it is determined that the IMEI of the UAV has not been registered.

According to a seventh aspect of embodiments of the present disclosure, there is provided a non-transitory computer readable storage medium having stored thereon a computer program for performing the access method of the UAV of the first aspect described above.

According to an eighth aspect of embodiments of the present disclosure, there is provided a non-transitory computer readable storage medium having stored thereon a computer program for performing the access method of the UAV of the second aspect described above.

According to a ninth aspect of embodiments of the present disclosure, there is provided a non-transitory computer readable storage medium having stored thereon a computer program for performing the access method of the UAV of the third aspect described above.

According to a tenth aspect of embodiments of the present disclosure, there is provided an access device of a UAV, applied to a Mobility Management Entity (MME), the device including:

a processor; and a memory for storing instructions executable by the processor, wherein the processor is configured to:

obtain an International Mobile Equipment Identity (IMEI) of the UAV upon receiving an attach request sent by the UAV;

perform identity authentication on the UAV according to the IMEI of the UAV so as to obtain an identity authentication result;

determine to accept an access of the UAV if the identity authentication result is authentication success; and send to the UAV a first attach response indicating acceptance of the access.

According to an eleventh aspect of embodiments of the present disclosure, there is provided an access device of a UAV, applied to the UAV the device type of which is defined as UAV and which has an International Mobile Equipment Identity (IMEI), the device including:

a processor; and a memory for storing instructions executable by the processor, wherein the processor is configured to:

send an attach request to a Mobility Management Entity (MME); and determine that the MME accepts access of the UAV if a first attach response sent by the MME indicating acceptance of the access is received.

According to a twelfth aspect of embodiments of the present disclosure, there is provided an access device of a UAV, applied to an Equipment Identity Register (ERI), the device including:

a processor; and a memory for storing instructions executable by the processor, wherein the processor is configured to:

receive an identity check request sent by a Mobility Management Entity (MME), the identity check request carrying an International Mobile Equipment Identity (IMEI) of the UAV that requests access;

determine whether the IMEI of the UAV has been registered;

send to the MME a first identity check response indicating that the IMEI of the UAV has been registered if it is determined that the IMEI of the UAV has been registered; and send to the MME a second identity check response indicating that the IMEI of the UAV has not been registered if it is determined that the IMEI of the UAV has not been registered.

The technical solutions provided by the embodiments of the present disclosure can include the following beneficial effects.

In the embodiments of the present disclosure, when receiving an attach request sent by the UAV, the MME can obtain the IMEI of the UAV, and perform the identity authentication on the UAV according to the IMEI of the UAV so as to obtain the identity authentication result. If the identity authentication result is authentication success, it is determined to accept the access of the UAV, and the first attach response for indicating the acceptance of the access is sent to the UAV, and thus it can prevent the UAVs that are not authenticated from accessing the cellular network, thereby reducing interference to the cellular network and improving the reliability of the access of the UAV.

In the embodiments of the present disclosure, by sending the identity request to the UAV and receiving the identity response sent by the UAV, the identity response carrying the IMEI of the UAV, the MME can perform identity authentication on the UAV with the IMEI provided by the UAV, which increases the efficiency of identity authentication of the UAV.

In the embodiments of the present disclosure, by reading the IMEI of the UAV from the attach request, the MME can obtain the IMEI of the UAV quickly, and perform identity authentication on the UAV with the IMEI provided by the UAV, which increases the efficiency of the identity authentication of the UAV.

In the embodiments of the present disclosure, the MME can also send an identity check request to the EIR, the identity check request carrying the IMEI of the UAV, so that the EIR can detect the identity of the UAV according to the IMEI of the UAV. If the IMEI of the UAV has been registered, indicating that the identity authentication result is authentication success, the access of the UAV is accepted; if the IMEI of the UAV has not been registered, indicating that the identity authentication result is authentication failure, the access of the UAV is rejected. Therefore, it is realized that only registered UAVs have access to the cellular network, thereby avoiding the situation that any type of UAVs can access the cellular network, and reducing the interference to the cellular network that would be caused by the access of the UAV.

In the embodiments of the present disclosure, the MME can accept the access of the UAV when the UAV is successfully authenticated and reject the access of the UAV when the authentication fails, so that UVAs that do not meet the access condition can be excluded by the authentication, which reduces the interference to the cellular network that would be caused by the access of the UAV.

In the embodiments of the present disclosure, the UAV can send an attach request to the MME and determine that the MME accepts the access of the UAV if the first attach response sent by the MME for indicating acceptance of the access is received, thereby implementing the control of the access of the UAV by the MME and improving the security of the access of the UAV.

In the embodiments of the present disclosure, the UAV can provide the IMEI of the UAV according to the requirements of the MME, which can facilitate the MME to perform identity authentication on the UAV based on the IMEI provided by the UAV, thereby improving the efficiency of the identity authentication of the UAV.

In the embodiments of the present disclosure, the UAV can provide the IMEI of the UAV actively to MME, which can facilitate the MME to perform identity authentication on the UAV based on the IMEI provided by the UAV, thereby improving the efficiency of the identity authentication of the UAV.

In the embodiments of the present disclosure, the UAV can send an attach request to the MME, determine that the MME accepts the access of the UAV if a first attach response sent by the MME for indicating acceptance of the access is received, and determine that the MME rejects the access of the UAV if a second attach response sent by the MME for indicating rejection of the access is received, thereby implementing the control of the access of the UAC by the MME, and excluding UAVs that do not meet the access condition, which reduces the interference to the cellular network that would be caused by the access of the UAV.

In the embodiments of the present disclosure, the EIR can perform the identity check on the UAV by determining whether the IMEI of the UAV has been registered, if the IMEI of the UAV has been registered, indicating that the identity authentication result is authentication failure, the MME accepts the access of the UAV; if the IMEI of the UAV has not been registered, indicating that the identity authentication result is authentication failure, MME rejects the access of the UAV. Therefore, it is realized that only registered UAVs have access to the cellular network, thereby avoiding the situation that any type of UAVs can access the cellular network, and reducing the interference to the cellular network that would be caused by the access of the UAV.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The terms used in the present disclosure are for the purpose of describing specific embodiments only and are not intended to limit the present disclosure. The singular forms of "a," "said" and "the" used in the disclosure and the appended claims are also intended to include the plural forms, unless it clearly indicates other meanings in the context. It should also be understood that the term "and/or" as used herein refers to and includes any or all possible combinations of one or more associated listed items.

It should be understood that although the terms of first, second, third, and so on may be used in the disclosure to describe various information, such information shall not be limited to these terms. These terms are used only to distinguish information of the same type from each other. For example, without departing from the scope of the present disclosure, the instruction information may also be referred to as the second information, similarly, the second information may also be referred to as the instruction information. Depending on the context, the word "if" as used here can be interpreted as "when" or "upon" or "in response to determining . . . ".

Figure 1:
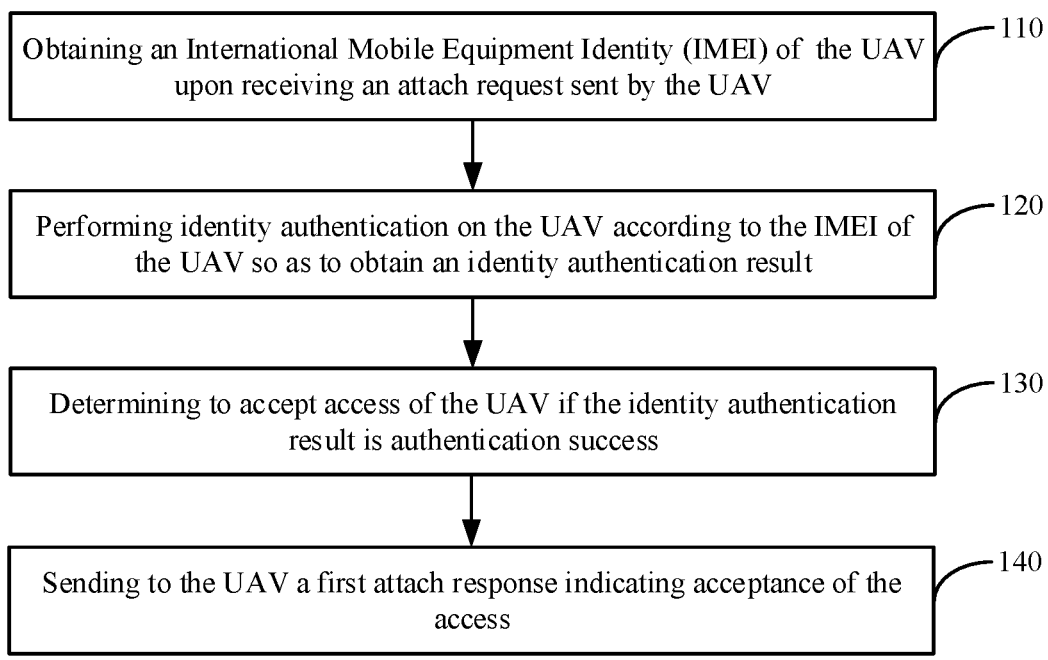
FIG. 1 is a flowchart showing an access method of a UAV according to an exemplary embodiment.

FIG. 1 is a flowchart of an access method of a UAV according to an exemplary embodiment. The access method of the UAV can be applied to a Mobility Management Entity (MME). As shown in FIG. 1, the access method of the UAV includes the following steps 110-140.

In step 110, upon receiving an attach request sent by the UAV, an International Mobile Equipment Identity (IMEI) of the UAV is obtained.

In some embodiments of the present disclosure, the UAV is a cellular network UAV, that is, the UAV can accept the service provided by the cellular network. Moreover, a new device type for the UAV is defined in Global System for Mobile Communications Alliance (GSMA), and a corresponding Type Allocation Code (TAC) is assigned to the device type of the UAV and the IMEI is formed. Each cellular network UAV is assigned a generated IMEI aforementioned.

In some embodiments of the present disclosure, when the UAV needs to access the cellular network, the attach request needs to be sent to the MME first, so that the MME can authenticate an identity of the UAV. When the attach request is sent to the MME by the UAV, the attach request can be transparently transmitted to the MME by a base station.

In some embodiments of the present disclosure, after the MME receives the attach request sent by the UAV, there are many approaches for obtaining the IMEI of the UAV, for example, requiring the UAV to report its own IMEI.

In step 120, an identity authentication is performed on the UAV according to the IMEI of the UAV so as to obtain an authentication result.

In some embodiments of the present disclosure, there are many approaches for the MME to perform the identity authentication on the UAV according to the IMEI of the UAV, for example, checking whether the IMEI reported by the UAV has been registered in the system, and if so, the access of the UAV is allowed; if not, the access of the UAV is rejected.

In step 130, if the identity authentication result is authentication success, it is determined to accept the access of the UAV.

In step 140, a first attach response indicating acceptance of the access is sent to the UAV.

In some embodiments of the present disclosure, the MME accepting the access of the UAV indicates that the UAV can access the cellular network. Moreover, when the MME sends a first attach response indicating acceptance of the access to the UAV, the first attach response can also be transparently transmitted to the UAV by the base station.

It can be seen from the above embodiments that, when the attach request sent by the UAV is received, the IMEI of the UAV is obtained, and the identity authentication is performed on the UAV according to the IMEI of the UAV so as to obtain the identity authentication result, if the identity authentication result is authentication success, it is determined that the access of the UAV is accepted, and the first attach response indicating the acceptance of the access is sent to the UAV, which prevents UAVs that are not authenticated from accessing the cellular network, thereby reducing interference to the cellular network and improving the reliability of the access of the UAV.

In an embodiment, the following obtaining approach can be adopted for obtaining the IMEI of the UAV in the above step 110:

(1) sending an identity request to the UAV, the identity request being used to instruct the UAV to provide its own IMEI; and (2) receiving an identity response sent by the UAV, the identity response carrying the IMEI of the UAV.

It can be seen from the above embodiments that by sending an identity request to the UAV and receiving an identity response sent by the UAV, where the identity response carrying the IMEI of the UAV, the identity authentication on the UAV can be performed with the IMEI provided by the UAV, which improves efficiency of the identity authentication on the UAV.

In an embodiment, in the foregoing step 110, the attach request carries the IMEI of the UAV, and in obtaining the IMEI of the UAV, the IMEI of the UAV can be directly read from the attach request.

It can be seen from the above embodiments that by reading the IMEI of the UAV from the attach request, the IMEI of the UAV can be obtained quickly, and the identity authentication on the UAV can be performed with the IMEI provided by the UAV, which improves efficiency of the identity authentication on the UAV.

In an embodiment, in the foregoing step 120, the identity authentication on the UAV is performed according to the IMEI of the UAV so as to obtain the authentication result, and the identity authentication can be performed by using the following approach:

(1) sending an identity check request to an Equipment Identity Register (EIR), where the identity check request carries the IMEI of the UAV;

(2) if a first identity check response sent by the EIR indicating that the IMEI of the UAV has been registered is received, determining that the identity authentication result is authentication success; and (3) if a second identity check response sent by the EIR indicating that the IMEI of the UAV has not been registered is received, it is determined that the identity authentication result is authentication failure.

It can be seen from the above embodiment that the identity check request is sent to the EIR, where the identity check request carries the IMEI of the UAV, so that the EIR can detect the identity of the UAV according to the IMEI of the UAV, if the IMEI of the UAV has been registered, indicating that the identity authentication result is authentication success, the access of the UAV is accepted, and if the IMEI of the UAV has not been registered, indicating that the identity authentication result is authentication failure, the access of the UAV is rejected. Therefore, it is realized that only registered UAVs have access to the cellular network, thereby avoiding the situation that any type of UAV can access the cellular network, and reducing the interference to the cellular network that would be caused by the access of the UAVs.

In an embodiment, after step 120, the access method of the UAV may further include the following steps:

determining to reject the access of the UAV if the identity authentication result is authentication failure; and sending to the UAV a second attach response indicating rejection of the access.

It can be seen from the above embodiments that if the UAV is successfully authenticated, it is allowed to access; if not, the access is rejected, so that UAVs that do not meet the access condition can be excluded by the authentication, which reduces the interference to the cellular network that would be caused by the access of the UAVs.

Figure 2:
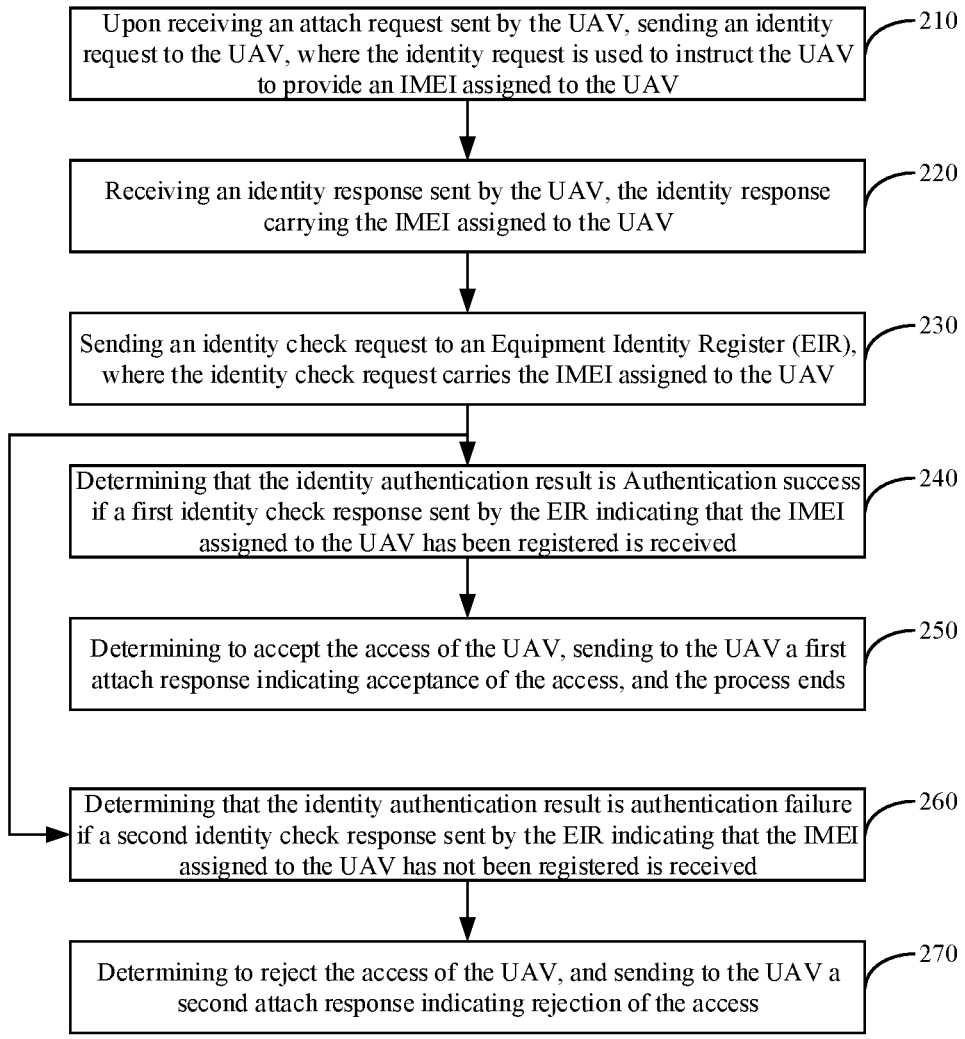
FIG. 2 is a flowchart showing another access method of a UAV according to an exemplary embodiment.

FIG. 2 is a flowchart showing another access method of a UAV according to an exemplary embodiment. The access method of the UAV can be applied to an MME and is based on the method shown in FIG. 1. As shown in FIG. 2, the access method of the UAV includes the following steps 210-270.

In step 210, upon receiving an attach request sent by the UAV, an identity request is sent to the UAV, where the identity request is used to instruct the UAV to provide its own IMEI.

In step 220, an identity response sent by the UAV is received, the identity response carrying the IMEI of the UAV.

In step 230, an identity check request is sent to an Equipment Identity Register (EIR), where the identity check request carries the IMEI of the UAV.

In step 240, if a first identity check response sent by the EIR indicating that the IMEI of the UAV has been registered is received, it is determined that the identity authentication result is authentication success.

In step 250, it is determined to accept the access of the UAV, a first attach response indicating acceptance of the access is sent to the UAV, and the process ends.

In step 260, if a second identity check response sent by the EIR indicating that the IMEI of the UAV has not been registered is received, it is determined that the identity authentication result is authentication failure.

In step 270, it is determined to reject the access of the UAV, and a second attach response indicating rejection of the access is sent to the UAV.

It can be seen from the above embodiments that the identity authentication is performed on the UAV with its own IMEI provided by the UAV, if the UAV is successfully authenticated, it is allowed to access; if not, the access is rejected, so that UAVs that do not meet the access condition can be excluded by the authentication, which reduces the interference to the cellular network that would be caused by the access of the UAVs.

Figure 3:
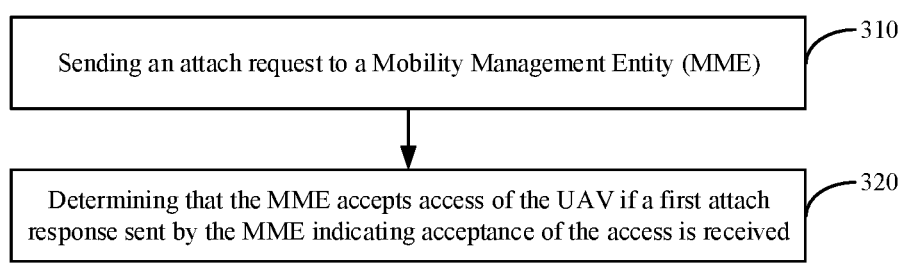
FIG. 3 is a flowchart showing an access method of a UAV according to an exemplary embodiment.

FIG. 3 is flowchart showing an access method of a UAV according to an exemplary embodiment. This access method of the UAV can be applied to a UAV, the device type of which is defined as UAV, and which has an IMEI. As shown in FIG. 3, the access method of the UAV includes the following steps 310-320.

In step 310, an attach request is sent to an MME.

In some embodiments of the present disclosure, the UAV is a cellular network UAV, and when the UAV needs to access the cellular network, the attach request needs to be sent to the MME first, so that the MME can authenticate the identity of the UAV. When the attach request is sent to the MME by the UAV, the attach request can be transparently transmitted to the MME by the base station.

In step 320, if the first attach response sent by the MME indicating acceptance of the access is received, it is determined that the MME accepts access of the UAV.

In some embodiments of the present disclosure, if the UAV receives the first attach response, the UAV is successfully authenticated and can access the cellular network.

It can be seen from the above embodiments that the attach request is sent to the MME, and if the first attach response sent by the MME indicating the acceptance of the access, it is determined that the MME accepts the access of the UAV, thereby implementing the control of UAV access by the MME and improving the security of the UAV access.

In an embodiment, after step 310, the access method of the UAV may further include the following steps:

(1) receiving an identity request sent by the MME, the identity request being used to instruct the UAV to provide its own IMEI; and (2) sending an identity response to the MME, the identity response carrying the IMEI of the UAV.

It can be seen from the foregoing embodiments that the IMEI of the UAV is provided according to the requirements of the MME, which can facilitate the MME to perform identity authentication on the UAV based on the IMEI provided by the UAV, thereby improving the efficiency of the identity authentication of the UAV.

In an embodiment, in the above step 310, the attach request sent by the UAV to the MME carries the IMEI of the UAV.

It can be seen from the foregoing embodiments that the IMEI of the UAV is provided actively to the MME, which can facilitate the MME to perform identity authentication on the UAV based on the IMEI provided by the UAV, thereby improving the efficiency of the identity authentication of the UAV.

In an embodiment, after the step 310, the access method of the UAV may further include the following steps:

determining that the MME rejects the access of the UAV if the second attach response sent by the MME indicating the rejection of access is received.

It can be seen from the foregoing embodiments that the attach request is sent to the MME, if the first attach response sent by the MME indicating the acceptance of the access is received, it is determined that the MME accepts the access of the UAV, and if the second attach response sent by the MME indicating the rejection of the access is received, it is determined that the MME rejects the access of the UAV, which implements the control of the UAC access by the MME, and excludes UAVs that do not meet the access condition, thereby reducing the interference to the cellular network that would be caused by the access of the UAVs.

Figure 4:
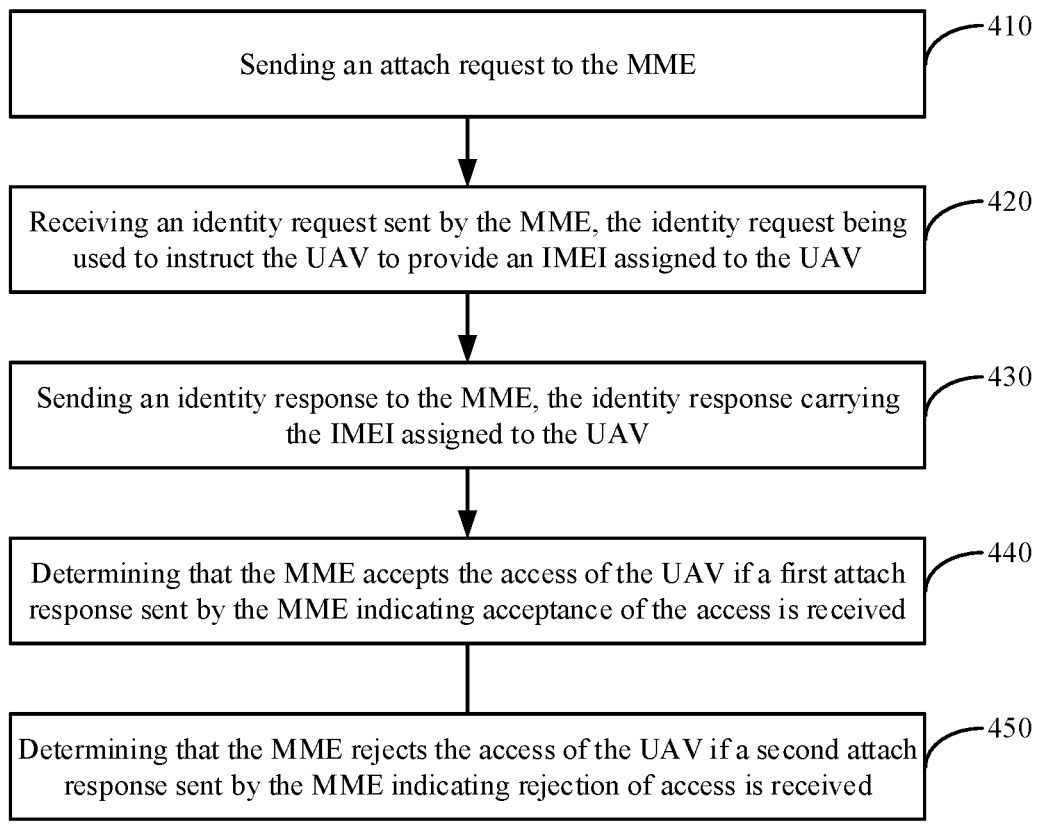
FIG. 4 is a flowchart showing another access method of a UAV according to an exemplary embodiment.

FIG. 4 is a flowchart showing another access method of a UAV according to an exemplary embodiment. This access method of the UAV can be applied to a UAV, the device type of which is defined as UAV, and which has an IMEI. This access method of the UAV is based on the method as shown in FIG. 3. As shown in FIG. 4, the access method of the UAV includes the following steps 410-450.

In step 410, an attach request is sent to the MME.

In step 420, an identity request sent by the MME is received, the identity request being used to instruct the UAV to provide its own IMEI.

In step 430, an identity response is sent to the MME, the identity response carrying the IMEI of the UAV.

In step 440, if a first attach response sent by the MME indicating acceptance of the access is received, it is determined that the MME accepts the access of the UAV.

In step 450, if a second attach response sent by the MME indicating rejection of access is received, it is determined that the MME rejects the access of the UAV.

It can be seen from the above embodiments that the IMEI of the UAV is provided according to the requirements of the MME, which can facilitate the MME to perform identity authentication on the UAV based on the IMEI provided by the UAV. If the UAV is successfully authenticated, it is allowed to access, and if not, the access is rejected, so that UAVs that do not meet the access condition can be excluded by the authentication, which reduces the interference to the cellular network that would be caused by the access of the UAVs.

Figure 5:
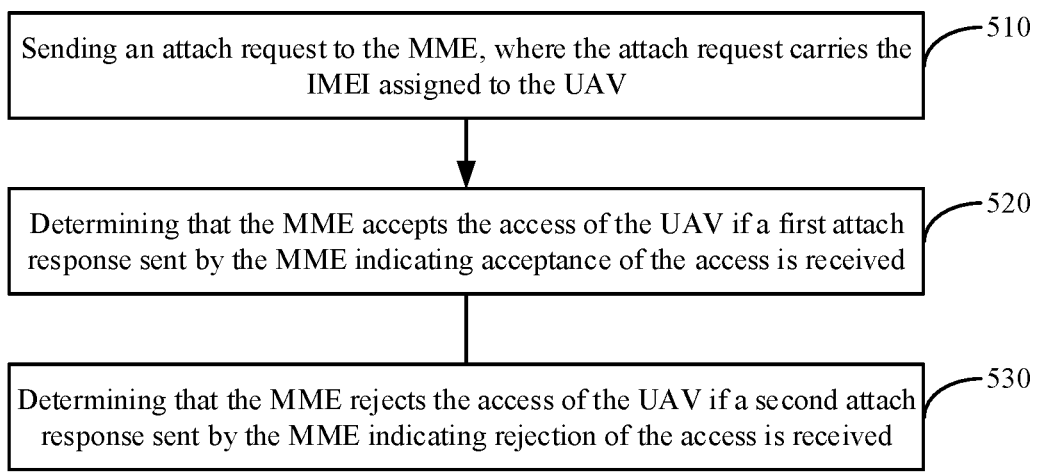
FIG. 5 is a flowchart showing another access method of a UAV according to an exemplary embodiment.

FIG. 5 is a flowchart showing another access method of a UAV according to an exemplary embodiment. This access method of the UAV can be applied to a UAV, the device type of which is defined as UAV, and which has an IMEI. This access method of the UAV is based on the method as shown in FIG. 3. As shown in FIG. 5, the access method of the UAV includes the following steps 510-530.

In step 510, an attach request is sent to the MME, where the attach request carries the IMEI of the UAV.

In step 520, if a first attach response sent by the MME indicating acceptance of the access is received, it is determined that the MME accepts access of the UAV.

In step 530, if a second attach response sent by the MME indicating rejection of access is received, it is determined that the MME rejects the access of the UAV.

It can be seen from the above embodiment that the IMEI of the UAV is provided actively to the MME, which can facilitate the MME to perform identity authentication on the UAV based on the IMEI provided by the UAV. If the UAV is successfully authenticated, it is allowed to access, and if not, the access is rejected, so that UAVs that do not meet the access condition can be excluded by the authentication, which reduces the interference to the cellular network that would be caused by the access of the UAVs.

Figure 6:
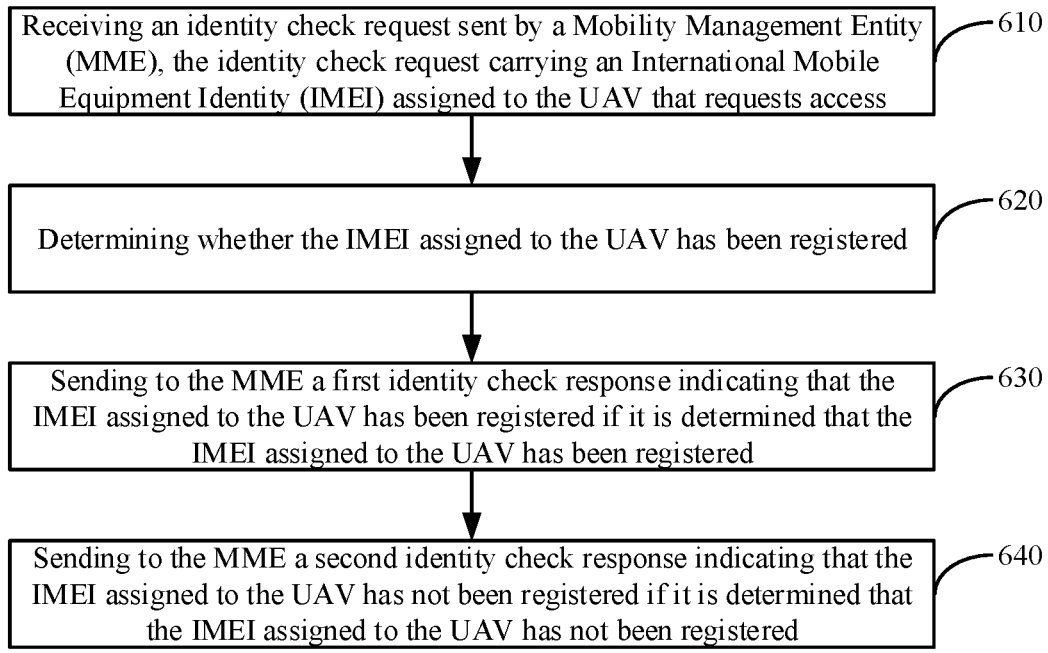
FIG. 6 is a flowchart showing an access method of a UAV according to an exemplary embodiment.

FIG. 6 is a flowchart showing an access method of a UAV according to an exemplary embodiment. This access method of the UAV can be applied to an EIR. As shown in FIG. 6, the access method of the UAV includes the following steps 610-640.

In step 610, an identity check request sent by an MME is received, where the identity check request carries the IMEI of the UAV that requests access.

In some embodiments of the present disclosure, the EIR can implement the function of identity check on the UAV.

In step 620, it is determined whether the IMEI of the UAV has been registered.

In step 630, if it is determined that the IMEI of the UAV has been registered, a first identity check response indicating that the IMEI of the UAV has been registered is sent to the MME.

In step 640, if it is determined that the IMEI of the UAV has not been registered, a second identity check response indicating that the IMEI of the UAV has not been registered is sent to the MME.

It can be seen from the above embodiments that the identity check on the UAV is performed by determining whether the IMEI of the UAV has been registered, if the IMEI of the UAV has been registered, indicating that the identity authentication result is authentication success, the MME accepts the access of the UAV, and if the IMEI of the UAV has not been registered, indicating that the identity authentication result is authentication failure, the MME rejects the access of the UAV. Therefore, it is realized that only registered UAVs have access to the cellular network, thereby avoiding the situation that any type of UAV can access the cellular network, and reducing the interference to the cellular network that would be caused by the access of the UAV.

Figure 7:
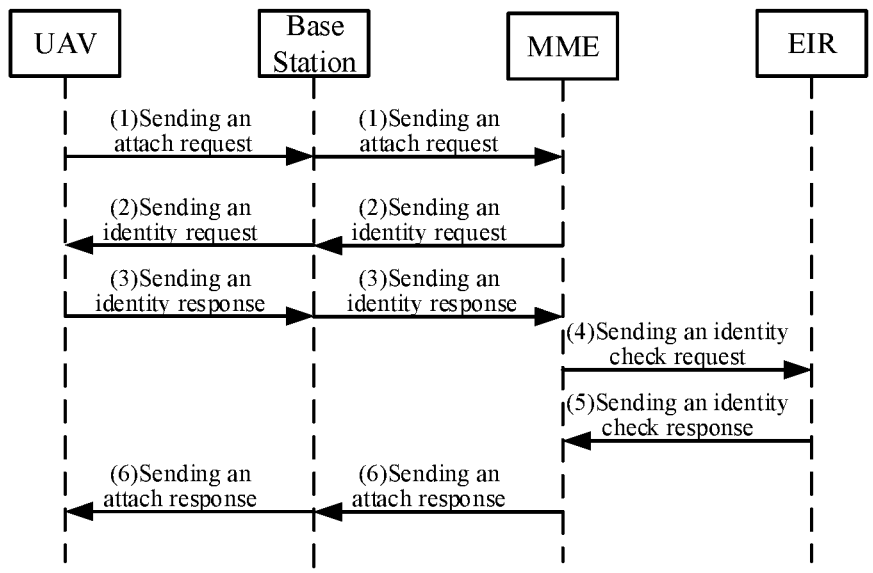
FIG. 7 is an information interaction diagram of an access method of a UAV according to an exemplary embodiment.

FIG. 7 is an information interaction diagram of an access method of a UAV according to an exemplary embodiment. As shown in FIG. 7, the information interaction diagram includes a UAV, a base station, an MME, and an EIR.

(1) The UAV transmits an attach request (Attach Request) to the base station, and the base station transparently transmits the attach request to the MME.

(2) The MME sends an identity request (Identity Request) to the base station, and the base station transparently transmits the identity request to the UAV. The identity request is used to instruct the UAV to provide its own IMEI.

(3) The UAV sends an identity response (Identity Response) to the base station, and the base station transparently transmits the identity response to the MME. The identity response carries the IMEI of the UAV.

(4) The MME sends an identity check request (ME Identity Check Request) to the EIR. The identity check request carries the IMEI of the UAV.

(5) The EIR sends an identity check acknowledge message (ME Identity Check Ack) to the MME. The identity check acknowledge message may be a first identity check response indicating that the IMEI of the UAV has been registered, or may be a second identity check response indicating that the IMEI of the UAV has not been registered.

(6) The MME sends an attach response (Attach Response) to the base station, and the base station transparently transmits the attach response to the UAV. The attach response may be a first attach response indicating that the access is accepted, or may be a second attach response indicating that the access is rejected.

Corresponding to the aforementioned embodiments of the access methods of the UAV, the present disclosure also provides embodiments of access devices of the UAV.

Figure 8:
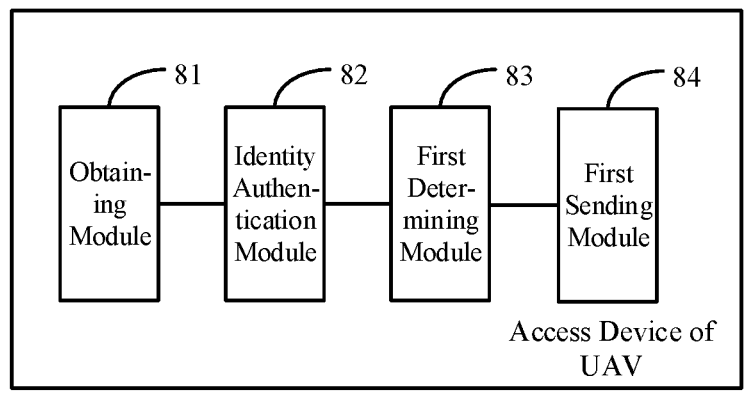
FIG. 8 is a block diagram illustrating an access device of a UAV according to an exemplary embodiment.

FIG. 8 is a block diagram illustrating an access device of a UAV according to an exemplary embodiment. The access device of the UAV can be applied to an MME and can be used for performing the access method of the UAV shown in FIG. 1. As shown in FIG. 8, the access device of the UAV can include:

an obtaining module 81 configured to obtain an IMEI of the UAV upon receiving an attach request sent by the UAV;

an identity authentication module 82 configured to perform identity authentication on the UAV according to the IMEI of the UAV so as to obtain an identity authentication result;

a first determining module 83 configured to determine to accept access of the UAV if the identity authentication result is authentication success; and a first sending module 84 configured to determine to accept the access of the UAV and send to the UAV a first attach response indicating acceptance of the access if the identity authentication result is authentication success.

It can be seen from the above embodiments that, upon receiving the attach request sent by the UAV, the IMEI of the UAV is obtained, and the identity authentication is performed on the UAV according to the IMEI of the UAV so as to obtain the identity authentication result. If the identity authentication result is authentication success, it is determined that the access of the UAV is accepted, and the first attach response indicating the acceptance of the access is sent to the UAV, which prevents UAVs that are not authenticated from accessing the cellular network, thereby reducing interference to the cellular network and improving the reliability of the UAV access.

Figure 9:
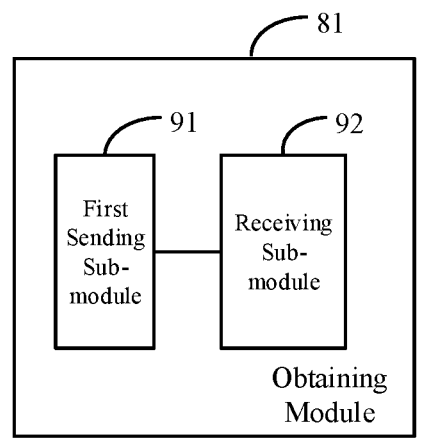
FIG. 9 is a block diagram illustrating another access device of a UAV according to an exemplary embodiment.

FIG. 9 is a block diagram illustrating another access device of a UAV according to an exemplary embodiment. The access device of the UAV can be applied to an MME and is based on the device shown in FIG. 8. As shown in FIG. 9, the obtaining module 81 can include:

a first sending sub-module 91 configured to send an identity request to the UAV, where the identity request is used to instruct the UAV to provide its own IMEI; and a receiving sub-module 92 configured to receive an identity response sent by the UAV, where the identity response carries the IMEI of the UAV.

It can be seen from the above embodiments that an identity request is sent to the UAV and an identity response sent by the UAV is received, where the identity response carrying the IMEI of the UAV, so that the identity authentication on the UAV can be performed with the IMEI provided by the UAV, which improves the efficiency of the identity authentication of the UAV.

Figure 10:
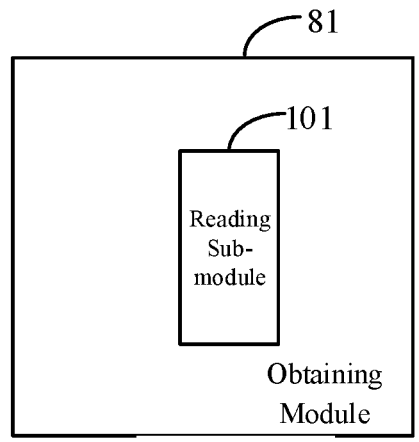
FIG. 10 is a block diagram illustrating another access device of a UAV according to an exemplary embodiment.

FIG. 10 is a block diagram illustrating another access device of a UAV according to an exemplary embodiment. The access device of the UAV can be applied to an MME and is based on the device shown in FIG. 8, where the attach request carries the IMEI of the UAV. As shown in FIG. 10, the obtaining module 81 can include:

a reading sub-module 101 configured to read the IMEI of the UAV from the attach request.

It can be seen from the above embodiments that the IMEI of the UAV is read from the attach request, and thus the IMEI of the UAV can be obtained quickly, and the identity authentication on the UAV can be performed with the IMEI provided by the UAV, which improves the efficiency of the identity authentication of the UAV.

Figure 11:
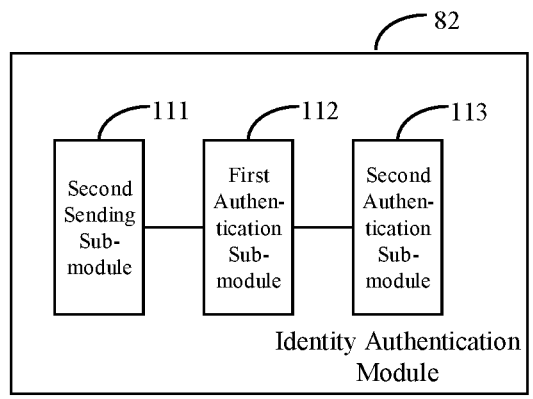
FIG. 11 is a block diagram illustrating another access device of a UAV according to an exemplary embodiment.

FIG. 11 is a block diagram illustrating another access device of a UAV according to an exemplary embodiment. The access device of the UAV can be applied to an MME and is based on the device shown in FIG. 8. As shown in FIG. 11, the identity authentication module 82 can include:

a second sending sub-module 111 configured to send an identity check request to an EIR, where the identity check request carries the IMEI of the UAV;

a first authentication sub-module 112 configured to determine that the identity authentication result is authentication success if a first identity check response sent by the EIR indicating that the IMEI of the UAV has been registered is received; and a second authentication sub-module 113 configured to determine that the identity authentication result is authentication failure if a second identity check response sent by the EIR indicating that the IMEI of the UAV has not been registered is received.

It can be seen from the above embodiments that an identity check request is sent to the EIR, where the identity check request carries the IMEI of the UAV, so that the EIR can detect the identity of the UAV according to the IMEI of the UAV. If the IMEI of the UAV has been registered, indicating that the identity authentication result is authentication success, the access of the UAV is accepted, and if the IMEI of the UAV has not been registered, indicating that the identity authentication result is authentication failure, the access of the UAV is rejected. Therefore, it is realized that only registered UAVs have access to the cellular network, thereby avoiding the situation that any type of UAV can access the cellular network, and reducing the interference to the cellular network that would be caused by the access of the UAV.

Figure 12:
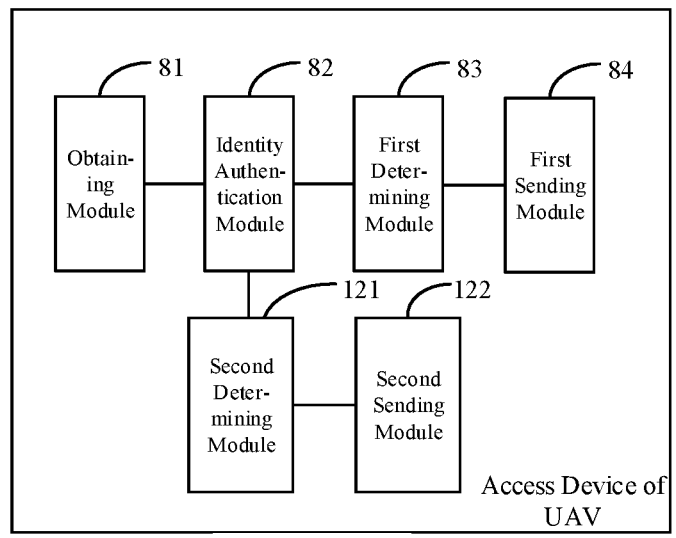
FIG. 12 is a block diagram illustrating another access device of a UAV according to an exemplary embodiment.

FIG. 12 is a block diagram illustrating another access device of a UAV according to an exemplary embodiment. The access device of the UAV can be applied to an MME and is based on the device shown in FIG. 8 or FIG. 11. As shown in FIG. 12, the access device of the UAV can further include:

a second determining module 121 configured to determine to reject the access of the UAV if the identity authentication result is authentication failure; and a second sending module 122 configured to send to the UAV a second attach response indicating rejection of the access.

It can be seen from the above embodiments that if the UAV is successfully authenticated, it is allowed to access, and if not, the access is rejected, so that UAVs that do not meet the access condition can be excluded by the authentication, which reduces the interference to the cellular network that would be caused by the access of the UAVs.

Figure 13:
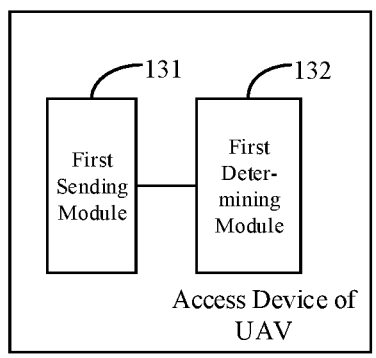
FIG. 13 is a block diagram illustrating an access device of a UAV according to an exemplary embodiment.

FIG. 13 is a block diagram illustrating another access device of a UAV according to an exemplary embodiment. The access device of the UAV can be applied to a UAV, the device type of which is defined as UAV and which has an IMEI. This access device of the UAV is used for performing the access method of the UAV shown in FIG. 5. As shown in FIG. 13, the access device of the UAV can include:

a first sending module 131 configured to send an attach request to an MME; and a first determining module 132 configured to determine that the MME accepts access of the UAV if a first attach response sent by the MME indicating acceptance of the access is received.

It can be seen from the above embodiments that, an attach request is sent to the MME, and if the first attach response sent by the MME indicating acceptance of the access is received, it is determined that the MME accepts the access of the UAV, thereby implementing the control of UAV access by the MME and improving the security of UAV access.

Figure 14:
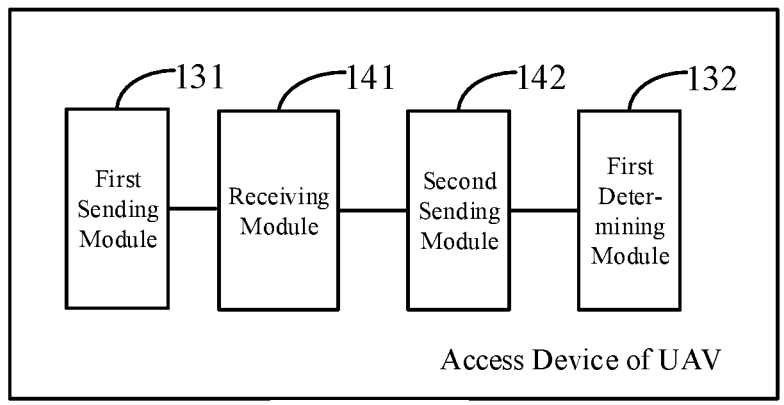
FIG. 14 is a block diagram illustrating another access device of a UAV according to an exemplary embodiment.

FIG. 14 is a block diagram illustrating another access device of a UAV according to an exemplary embodiment. The access device of the UAV can be applied to a UAV, the device type of which is defined as UAV and which has an IMEI. This access device of the UAV is based on the device shown in FIG. 13. As shown in FIG. 14, the access device of the UAV can further include:

a receiving module 141 configured to receive an identity request sent by the MME, where the identity request is used to instruct the UAV to provide its own IMEI; and a second sending module 142 configured to send an identity response to the MME, where the identity response carries an IMEI of the UAV.

It can be seen from the foregoing embodiments that the IMEI of the UAV is provided according to the requirements of the MME, which can facilitate the MME to perform identity authentication on the UAV based on the IMEI provided by the UAV, thereby improving the efficiency of the UAV identity authentication.

In an embodiment, based on the device shown in FIG. 13, the attach request carries the IMEI of the UAV.

It can be seen from the foregoing embodiments that the IMEI of the UAV is provided actively to the MME, which can facilitate the MME to perform identity authentication on the UAV based on the IMEI provided by the UAV, thereby improving the efficiency of the UAV identity authentication.

Figure 15:
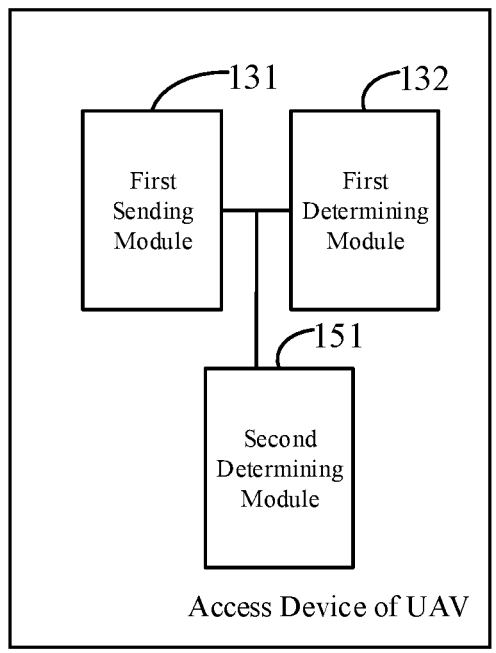
FIG. 15 is a block diagram illustrating another access device of a UAV according to an exemplary embodiment.

FIG. 15 is a block diagram illustrating another access device of a UAV according to an exemplary embodiment. The access device of the UAV can be applied to a UAV, the device type of which is defined as UAV and which has an IMEI. This access device of the UAV is based on the device shown in FIG. 13. As shown in FIG. 15, the access device of the UAV can further include:

a second determining module 151 configured to determine that the MME rejects the access of the UAV if a second attach response sent by the MME indicating rejection of the access is received.

It can be seen from the foregoing embodiments that the attach request is sent to the MME, if the first attach response sent by the MME indicating the acceptance of the access is received, it is determined that the MME accepts the access of the UAV, and if the second attach response sent by the MME indicating the rejection of the access is received, it is determined that the MME rejects the access of the UAV, which implements the control of the UAC access by the MME, and excludes UAVs that do not meet the access condition, thereby reducing the interference to the cellular network that would be caused by the access of the UAVs.

Figure 16:
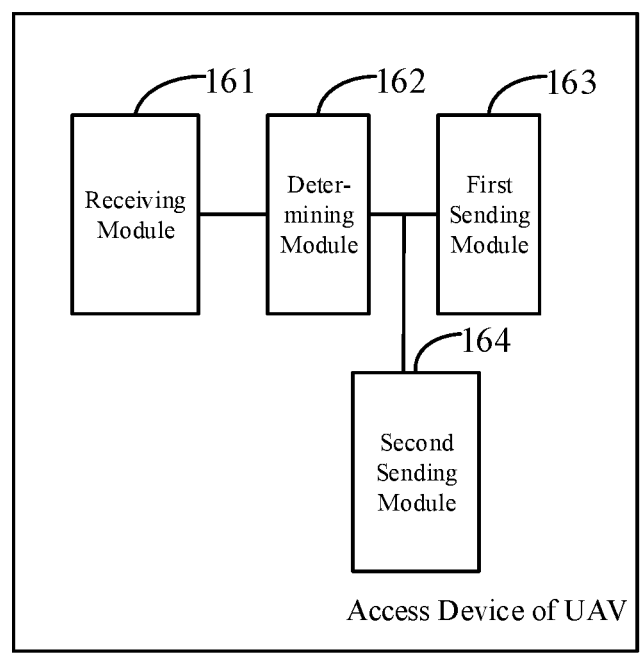
FIG. 16 is a block diagram illustrating an access device of a UAV according to an exemplary embodiment.

FIG. 16 is a block diagram illustrating an access device of a UAV according to an exemplary embodiment. The access device of the UAV can be applied to an EIR and can be used for performing the access method of the UAV shown in FIG. 7. As shown in FIG. 16, the access device of the UAV can include:

a receiving module 161 configured to receive an identity check request sent by an MME, where the identity check request carries an IMEI of the UAV that requests access;

a determining module 162 configured to determine whether the IMEI of the UAV has been registered;

a first sending module 163 configured to send to the MME a first identity check response indicating that the IMEI of the UAV has been registered if it is determined that the IMEI of the UAV has been registered; and a second sending module 164 configured to send to the MME a second identity check response indicating that the IMEI of the UAV has not been registered if it is determined that the IMEI of the UAV has not been registered.

It can be seen from the above embodiments that the identity check on the UAV is performed by determining whether the IMEI of the UAV has been registered, if the IMEI of the UAV has been registered, indicating that the identity authentication result is authentication success, the MME accepts the access of the UAV, and if the IMEI of the UAV has not been registered, indicating that the identity authentication result is authentication failure, the MME rejects the access of the UAV. Therefore, it is realized that only registered UAVs have access to the cellular network, thereby avoiding the situation that any type of UAV can access the cellular network, and reducing the interference to the cellular network that would be caused by the access of the UAV.

For the embodiments of the devices, since they basically correspond to the embodiments of the methods, reference can be made to part of the description of the embodiments of the methods. The embodiments of the devices described above are merely illustrative, where the units which are described as separate components may be or may not be physically separated, and the components which are shown as units may be or may not be physical units, i.e., they may be located in one place, or they may be distributed to multiple network units. Some or all of the modules may be selected according to actual needs so as to achieve the objectives of the technical solutions of the present disclosure. Those ordinary skilled in the art can understand and implement them without any creative effort.

Correspondingly, the present disclosure also provides a non-transitory computer readable storage medium having stored thereon a computer program, where the computer program is used for performing any of the access methods of the UAV as described above in FIGS. 1 to 3.

Correspondingly, the present disclosure also provides a non-transitory computer readable storage medium having stored thereon a computer program, where the computer program is used for performing any of the access methods of the UAV as described above in FIGS. 4 to 6.

Correspondingly, the present disclosure also provides a non-transitory computer readable storage medium having stored thereon a computer program, where the computer program is used for performing the access method of the UAV as described above in FIG. 7.

Correspondingly, the present disclosure also provides an access device of a UAV, the device is applied to an MME, and the device includes:

a processor; and a memory for storing instructions executable by the processor, wherein the processor is configured to:

obtain an IMEI of the UAV upon receiving an attach request sent by the UAV;

perform identity authentication on the UAV according to the IMEI of the UAV so as to obtain an identity authentication result;

determine to accept access of the UAV if the identity authentication result is authentication success; and send to the UAV a first attach response indicating acceptance of the access.

Figure 17:
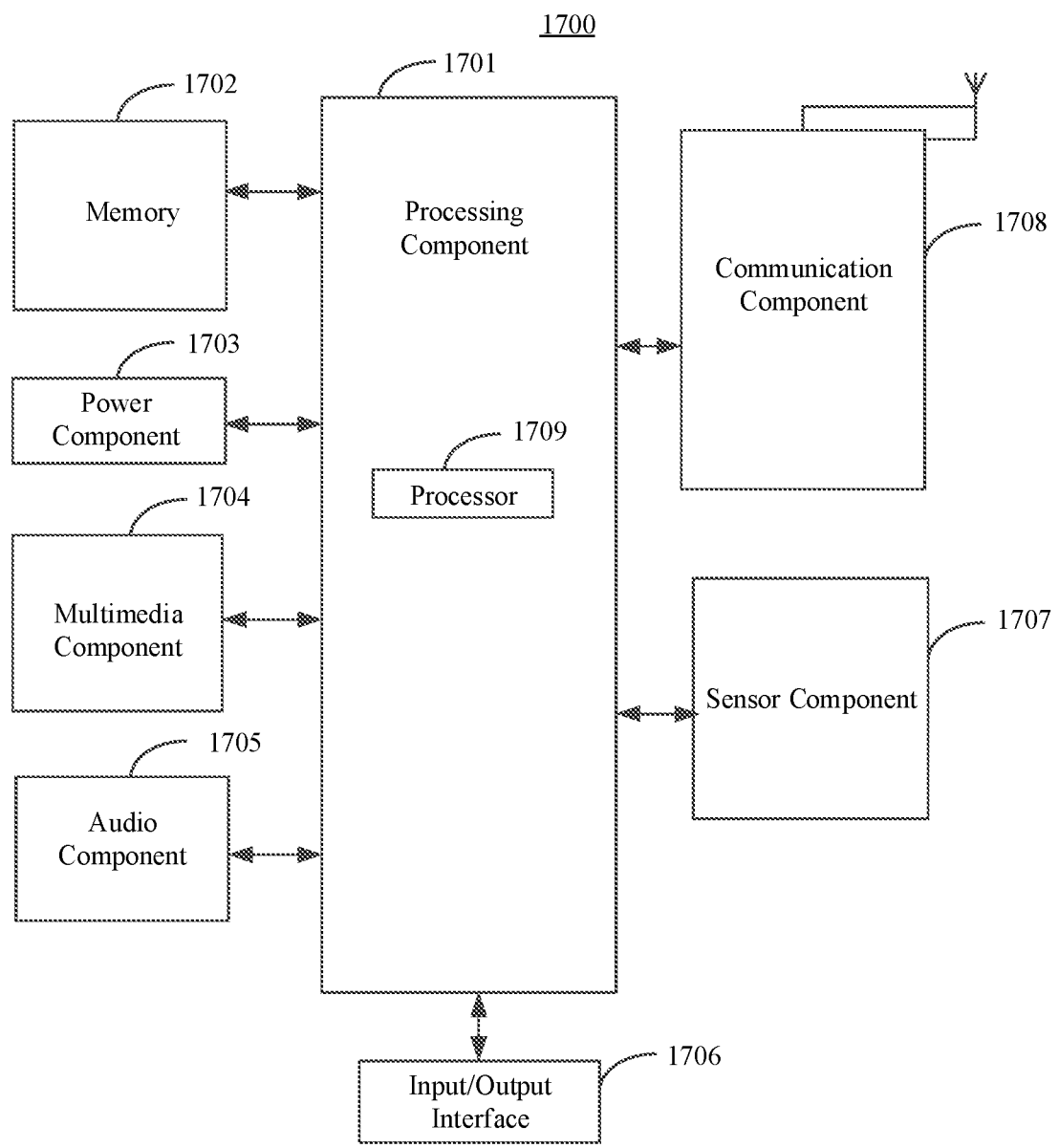
FIG. 17 is a structural schematic diagram of an access device of a UAV according to an exemplary embodiment.

FIG. 17 is a schematic structural diagram of an access device of a UAV according to an exemplary embodiment. As shown in FIG. 17, the access device 1700 of the UAV according to an exemplary embodiment can be provided as an MME.

Referring to FIG. 17, the device 1700 may include one or more of the following components: a processing component 1701, a memory 1702, a power component 1703, a multimedia component 1704, an audio component 1705, an input/output (I/O) interface 1706, a sensor component 1707, and a communication component 1708.

The processing component 1701 typically controls overall operations of the device 1700, such as the operations associated with display, telephone calls, data communications, camera operations, and recording operations. The processing component 1701 may include one or more processors 1709 to execute instructions to perform all or part of the steps in the above described methods. Moreover, the processing component 1701 may include one or more modules which facilitate the interaction between the processing component 1701 and other components. For instance, the processing component 1701 may include a multimedia module to facilitate the interaction between the multimedia component 1704 and the processing component 1701.

The memory 1702 is configured to store various types of data to support the operation of the device 1700. Examples of such data include instructions for any applications or methods operated on the device 1700, contact data, phonebook data, messages, pictures, video, etc. The memory 1702 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1703 provides power to various components of the device 1700. The power component 1703 may include a power management system, one or more power sources, and any other components associated with the generation, management, and distribution of power in the device 1700.

The multimedia component 1704 includes a screen providing an output interface between the device 1700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1704 includes a front camera and/or a rear camera. The front camera and the rear camera may receive an external multimedia datum while the device 1700 is in an operation mode, such as a photographing mode or a video mode. Each of the front camera and the rear camera may be a fixed optical lens system or have focus and optical zoom capability.

The audio component 1705 is configured to output and/or input audio signals. For example, the audio component 1705 includes a microphone ("MIC") configured to receive an external audio signal when the device 1700 is in an operation mode, such as a call mode, a recording mode, and a voice recognition mode. The received audio signal may be further stored in the memory 1702 or transmitted via the communication component 1708. In some embodiments, the audio component 1705 further includes a speaker to output audio signals.

The I/O interface 1706 provides an interface between the processing component 1701 and peripheral interface modules, such as a keyboard, a click wheel, buttons, and the like. The buttons may include, but are not limited to, a home button, a volume button, a starting button, and a locking button.

The sensor component 1707 includes one or more sensors to provide status assessments of various aspects of the device 1700. For instance, the sensor component 1707 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1707 may include a proximity sensor configured to detect the presence of nearby objects without any physical contact. The sensor component 1707 may also include a light sensor, such as a CMOS or CCD image sensor, for use in imaging applications. In some embodiments, the sensor component 1707 may also include an accelerometer sensor, a gyroscope sensor, a magnetic sensor, a pressure sensor, or a temperature sensor.

The communication component 1708 is configured to facilitate communication, wired or wirelessly, between the device 1700 and other devices. The device 1700 can access a wireless network based on a communication standard, such as WiFi, 2G, or 3G, or a combination thereof. In one exemplary embodiment, the communication component 1708 receives a broadcast signal or broadcast associated information from an external broadcast management system via a broadcast channel. In one exemplary embodiment, the communication component 1708 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1702, executable by the processor 1709 in the device 1700, for performing the above-described methods. For example, the non-transitory computer-readable storage medium may be a ROM, a RAM, a CD-ROM, a magnetic tape, a floppy disc, an optical data storage device, and the like.

The instructions in the storage medium, when executed by the processor, enables the device 1700 to perform any of the access methods of the UAV as described above.

Correspondingly, the present disclosure also provides an access device of a UAV. The access device of the UAV is applied to a UAV, the device type of which is defined as UAV and which has an IMEI, and the device includes:

a processor; and a memory for storing instructions executable by the processor, wherein the processor is configured to:

send an attach request to an MME; and determine that the MME accepts access of the UAV if a first attach response sent by the MME indicating acceptance of the access is received.

Correspondingly, the present disclosure also provides an access device of a UAV, the device is applied to an EIR, and the device includes:

a processor; and a memory for storing instructions executable by the processor, wherein the processor is configured to:

receive an identity check request sent by an MME, where the identity check request carries an IMEI of the UAV that requests access;

determine whether the IMEI of the UAV has been registered;

send to the MME a first identity check response indicating that the IMEI of the UAV has been registered if it is determined that the IMEI of the UAV has been registered; and send to the MME a second identity check response indicating that the IMEI of the UAV has not been registered if it is determined that the IMEI of the UAV has not been registered.

Figure 18:
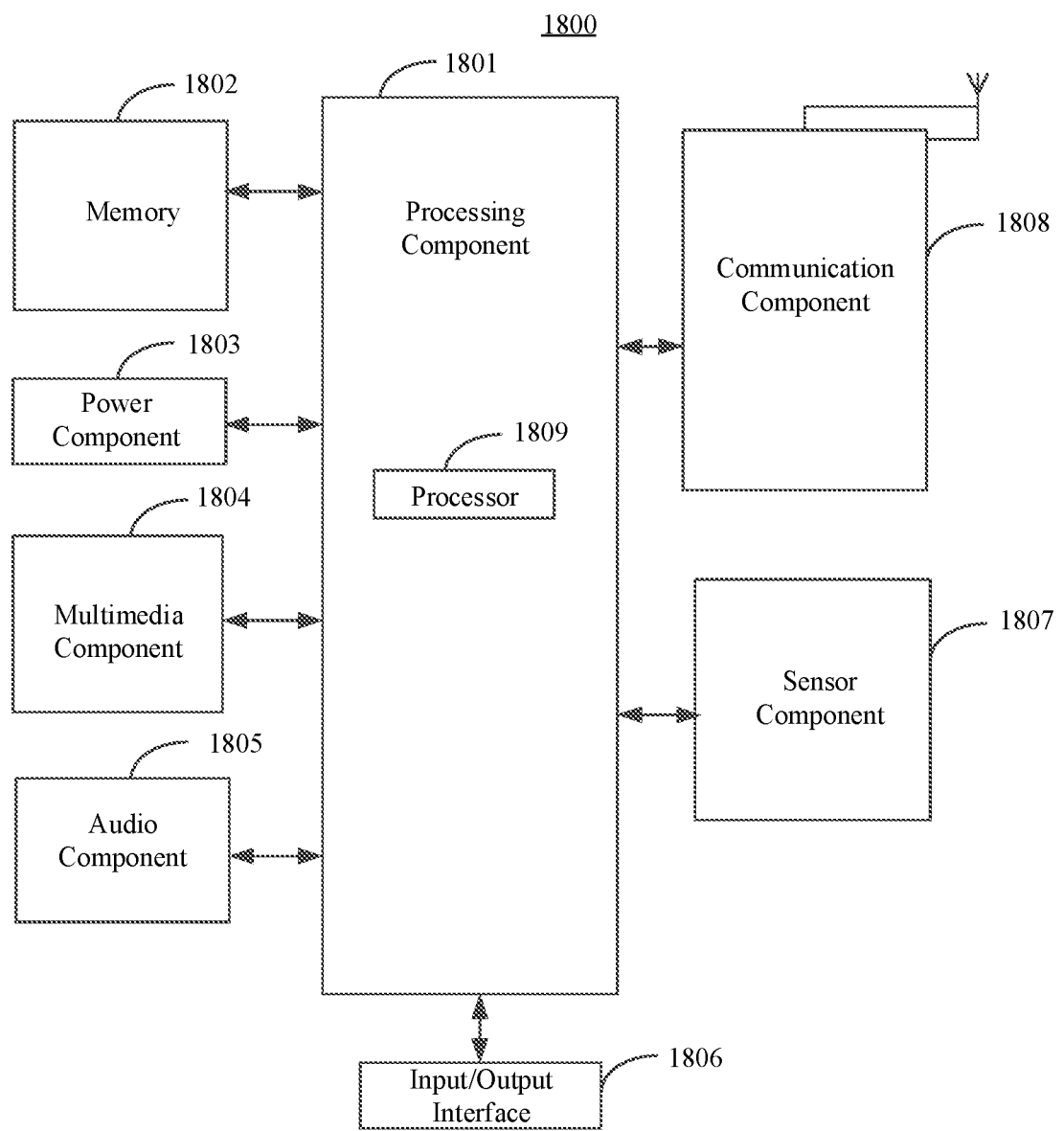
FIG. 18 is a structural schematic diagram of an access device of a UAV according to an exemplary embodiment.

FIG. 18 is a schematic structural diagram of an access device of a UAV according to an exemplary embodiment. As shown in FIG. 18, the access device 1800 of the UAV according to an exemplary embodiment can be provided as an EIR.

Referring to FIG. 18, the device 1800 may include one or more of the following components: a processing component 1801, a memory 1802, a power component 1803, a multimedia component 1804, an audio component 1805, an input/output (I/O) interface 1806, a sensor component 1807, and a communication component 1808.

The processing component 1801 typically controls overall operations of the device 1800, such as the operations associated with display, telephone calls, data communications, camera operations, and recording operations. The processing component 1801 may include one or more processors 1809 to execute instructions to perform all or part of the steps in the above described methods. Moreover, the processing component 1801 may include one or more modules which facilitate the interaction between the processing component 1801 and other components. For instance, the processing component 1801 may include a multimedia module to facilitate the interaction between the multimedia component 1804 and the processing component 1801.

The memory 1802 is configured to store various types of data to support the operation of the device 1800. Examples of such data include instructions for any applications or methods operated on the device 1800, contact data, phonebook data, messages, pictures, video, etc. The memory 1802 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1803 provides power to various components of the device 1800. The power component 1803 may include a power management system, one or more power sources, and any other components associated with the generation, management, and distribution of power in the device 1800.

The multimedia component 1804 includes a screen providing an output interface between the device 1800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1804 includes a front camera and/or a rear camera. The front camera and the rear camera may receive an external multimedia datum while the device 1800 is in an operation mode, such as a photographing mode or a video mode. Each of the front camera and the rear camera may be a fixed optical lens system or have focus and optical zoom capability.

The audio component 1805 is configured to output and/or input audio signals. For example, the audio component 1805 includes a microphone ("MIC") configured to receive an external audio signal when the device 1800 is in an operation mode, such as a call mode, a recording mode, and a voice recognition mode. The received audio signal may be further stored in the memory 1802 or transmitted via the communication component 1808. In some embodiments, the audio component 1805 further includes a speaker to output audio signals.

The I/O interface 1806 provides an interface between the processing component 1801 and peripheral interface modules, such as a keyboard, a click wheel, buttons, and the like. The buttons may include, but are not limited to, a home button, a volume button, a starting button, and a locking button.

The sensor component 1807 includes one or more sensors to provide status assessments of various aspects of the device 1800. For instance, the sensor component 1807 may detect an open/closed status of the device 1800, relative positioning of components, e.g., the display and the keypad, of the device 1800, a change in position of the device 1800 or a component of the device 1800, a presence or absence of user contact with the device 1800, an orientation or an acceleration/deceleration of the device 1800, and a change in temperature of the device 1800. The sensor component 1807 may include a proximity sensor configured to detect the presence of nearby objects without any physical contact. The sensor component 1807 may also include a light sensor, such as a CMOS or CCD image sensor, for use in imaging applications. In some embodiments, the sensor component 1807 may also include an accelerometer sensor, a gyroscope sensor, a magnetic sensor, a pressure sensor, or a temperature sensor.

The communication component 1808 is configured to facilitate communication, wired or wirelessly, between the device 1800 and other devices. The device 1800 can access a wireless network based on a communication standard, such as Wi-Fi, 2G, or 3G, or a combination thereof. In one exemplary embodiment, the communication component 1808 receives a broadcast signal or broadcast associated information from an external broadcast management system via a broadcast channel. In one exemplary embodiment, the communication component 1808 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1802, executable by the processor 1809 in the device 1800, for performing the above-described methods. For example, the non-transitory computer-readable storage medium may be a ROM, a RAM, a CD-ROM, a magnetic tape, a floppy disc, an optical data storage device, and the like.

The instructions in the storage medium, when executed by the processor, enables the device 1800 to perform any of the access methods of the UAV as described above.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The invention claimed is:

1. An access method of an Unmanned Aerial Vehicle (UAV), applied to a Mobility Management Entity (MME), the method comprising:
   obtaining an International Mobile Equipment Identity (IMEI) of the UAV upon receiving an attach request sent by the UAV;
   performing identity authentication on the UAV according to the IMEI of the UAV so as to obtain an identity authentication result;
   determining to accept access of the UAV in a case that the identity authentication result is authentication success; and
   sending to the UAV a first attach response indicating acceptance of the access;
   wherein the performing the identity authentication on the UAV according to the IMEI of the UAV so as to obtain the identity authentication result comprises:
   sending an identity check request to an Equipment Identity Register (EIR), the identity check request carrying the IMEI of the UAV;
   determining that the identity authentication result is authentication success in a case that a first identity check response sent by the EIR indicating that the IMEI of the UAV has been registered is received; and
   determining that the identity authentication result is authentication failure in a case that a second identity check response sent by the EIR indicating that the IMEI of the UAV has not been registered is received.

2. The method of claim 1, wherein the obtaining the IMEI of the UAV comprises:
   sending an identity request to the UAV, the identity request being used to instruct the UAV to provide its own IMEI; and
   receiving an identity response sent by the UAV, wherein the identity response carries the IMEI of the UAV.

3. The method of claim 1, wherein the attach request carries the IMEI of the UAV, and the obtaining the IMEI of the UAV comprises:
   reading the IMEI of the UAV from the attach request.

4. The method of claim 1, wherein the method further comprises:
   determining to reject the access of the UAV in a case that the identity authentication result is authentication failure; and
   sending to the UAV a second attach response indicating rejection of the access.

5. An access device of an Unmanned Aerial Vehicle (UAV), applied to a Mobility Management Entity (MME) and implementing the access method of claim 1, the device comprising:
   a processor; and
   a memory for storing instructions executable by the processor,
   wherein the processor is configured to perform operations of the access method.

6. The device of claim 5, wherein the processor is further configured to:
   send an identity request to the UAV, the identity request being used to instruct the UAV to provide its own IMEI; and
   receive an identity response sent by the UAV, wherein the identity response carries the IMEI of the UAV.

7. The device of claim 5, wherein the attach request carries the IMEI of the UAV, and the processor is further configured to read the IMEI of the UAV from the attach request.

8. The device of claim 5, wherein the processor is further configured to:
   determine to reject the access of the UAV in a case that the identity authentication result is authentication failure; and
   send to the UAV a second attach response indicating rejection of the access.

9. A communications network implementing the method of claim 1, comprising the MME and an Equipment Identity Register (EIR), wherein
   the MME is configured to prevent un-authenticated UAVs from accessing the communications network, thereby reducing interference and improving reliability of the UAV accessing the communications network;
   the EIR is configured to detect identity of the UAV according to the IMEI carrying an identity check request obtained from the MME; and
   the IMEI of the UAV being registered indicates that the identity authentication result is authentication success, and IMEIs of the un-authenticated UAVs being unregistered indicates authentication failures.

10. An access method of an Unmanned Aerial Vehicle (UAV), applied to an Equipment Identity Register (EIR), the method comprising:

receiving an identity check request sent by a Mobility Management Entity (MME), the identity check request carrying an International Mobile Equipment Identity (IMEI) of the UAV that requests access;

determining whether the IMEI of the UAV has been registered;

sending to the MME a first identity check response indicating that the IMEI of the UAV has been registered in a case that it is determined that the IMEI of the UAV has been registered; and sending to the MME a second identity check response indicating that the IMEI of the UAV has not been registered in a case that it is determined that the IMEI of the UAV has not been registered.

11. An access device of an Unmanned Aerial Vehicle (UAV), applied to an Equipment Identity Register (EIR) and implementing the access method of claim 10, the device comprising:

a processor; and a memory for storing instructions executable by the processor, wherein the processor is configured to perform operations of the access method.

\* \* \* \* \*